(12) United States Patent  
Arensmeier

(10) Patent No.: US 9,593,984 B2
(45) Date of Patent: Mar. 14, 2017

(54) SENSOR PROBE

(71) Applicant: Emerson Electric Co., St. Louis, MO (US)

(72) Inventor: Jeffrey N. Arensmeier, Fenton, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 369 days.

(21) Appl. No.: 14/267,367

(22) Filed: May 1, 2014

(65) Prior Publication Data
US 2014/0334525 A1 Nov. 13, 2014

Related U.S. Application Data

(60) Provisional application No. 61/822,606, filed on May 13, 2013.

(51) Int. Cl.
G01K 13/02 (2006.01)
G01K 1/08 (2006.01)
G01K 7/22 (2006.01)

(52) U.S. Cl.
CPC ............. G01K 1/08 (2013.01); G01K 7/22 (2013.01); G01K 13/02 (2013.01); G01K 2013/024 (2013.01)

(58) Field of Classification Search
CPC ............................................. G01K 2013/024
(Continued)

(56) References Cited

U.S. PATENT DOCUMENTS 3,630,080 A * 12/1971 Taylor ............... F16L 29/00
374/142
6,325,535 B1 * 12/2001 Gibson ............... G01K 1/12
122/504.2
(Continued)

FOREIGN PATENT DOCUMENTS

CN 1330766 A 1/2002
CN 1532531 A 9/2004
(Continued)

OTHER PUBLICATIONS

Zone Pressure Probes & Accessories—Zone Pressure Sensors (ZPS). Building Automation Products, Inc., Rev. Oct. 16, 2012.
(Continued)

Primary Examiner — Minh Phan
Assistant Examiner — Leon W Rhodes, Jr.
(74) Attorney, Agent, or Firm — Harness, Dickey & Pierce, P.L.C.

(57) ABSTRACT

A sensor probe may include an elongated body and a temperature sensor. The elongated body may include at least one first aperture, a first passageway and a second passageway. The first passageway may be in communication with the first aperture and may extend along a longitudinal axis of the elongated body. The second passageway may be in communication with and may extend from the first passageway. The temperature sensor may be disposed within the first passageway and may include a wire extending through a portion of the first passageway and the second passageway. The wire may include a diameter that is less than a diameter of the first passageway such that the first passageway defines a pressure path around the wire.

20 Claims, 7 Drawing Sheets

(58) Field of Classification Search
USPC .......................................................... 374/143
See application file for complete search history.

(56) References Cited

U.S. PATENT DOCUMENTS

| | | | | |
|---|---|---|---|---|
| 8,034,170 | B2 * | 10/2011 | Kates | F24F 3/1603 |
| | | | | 116/112 |
| 9,116,074 | B2 * | 8/2015 | Berkel | G01M 15/08 |
| 2003/0145661 | A1 * | 8/2003 | Taranto | G01F 1/46 |
| | | | | 73/861.65 |
| 2007/0044547 | A1 | 3/2007 | Zhang | |
| 2012/0255851 | A1 | 10/2012 | Freeman | |

FOREIGN PATENT DOCUMENTS

| | | |
|---|---|---|
| CN | 101124436 A | 2/2008 |
| CN | 101285726 A | 10/2008 |
| CN | 203949695 U | 11/2014 |
| DE | 202006017595 U1 | 2/2007 |
| WO | WO-2004029571 A1 | 4/2004 |

OTHER PUBLICATIONS

Pitot Tube Assembly—Instructions & Operation. Building Automation Products, Inc., Rev. Nov. 29, 2005.
Static Pressure Accessories—Installation and Operation Instructions. Building Automation Products, Inc., Rev. Mar. 22, 2011.
Office Action regarding Chinese Patent Application No. 201410200775.3, dated Feb. 1, 2016. Translation provided by Unitalen Attorneys at Law.
Office Action regarding Chinese Patent Application No. 201410200775.3, dated Oct. 17, 2016. Translation provided by Unitalen Attorneys At Law.

* cited by examiner

SENSOR PROBE

CROSS-REFERENCE TO RELATED APPLICATIONS

This application claims the benefit of U.S. Provisional Application No. 61/822,606, filed on May 13, 2013. The entire disclosure of the above application is incorporated herein by reference.

FIELD

The present disclosure relates to a sensor probe.

SUMMARY

This section provides a general summary of the disclosure, and is not a comprehensive disclosure of its full scope or all of its features.

In one form, the present disclosure provides a sensor assembly for a climate control system that may include a pressure-differential sensor and first and second sensor probes in communication with the pressure-differential sensor. Each of the first and second sensor probes may include an elongated body and a temperature sensor. The elongated body may include at least one first aperture, a first passageway and a second passageway. The first passageway may be in communication with the first aperture and may extend along a longitudinal axis of the elongated body. The second passageway may be in communication with and may extend from the first passageway. The temperature sensor may be disposed within the first passageway and may include a wire extending through a portion of the first passageway and the second passageway. The wire may include a diameter that is less than a diameter of the first passageway such that the first passageway defines a pressure path around the wire.

In some embodiments, the sensor assembly may be used for controlling and/or monitoring operation of a climate control system (e.g., a refrigeration system, air-conditioning system or a heat-pump system). Additionally or alternatively, the sensor assembly may be used for diagnosing faults of the climate control system.

In some embodiments, the wire sealingly engages the second passageway.

In some embodiments, the at least one first aperture provides communication between an ambient environment and the temperature sensor.

In some embodiments, the elongated body includes a plurality of first apertures providing communication between the ambient environment and the temperature sensor.

In some embodiments, the elongated body includes grooves providing communication between the first apertures.

In some embodiments, the elongated body includes at least one second aperture in communication with the first passageway and disposed between the temperature sensor and the second passageway.

In some embodiments, the elongated body includes a pointed tip.

In some embodiments, each of the first and second sensor probes includes a base from which the elongated body extends. The first and second passageways may extend through the base.

In some embodiments, each of the first and second sensor probes includes a conduit fitting extending from the base in a direction opposite the elongated body.

In some embodiments, the first passageway extends through the conduit fitting.

In some embodiments, the sensor assembly may include first and second conduits fluidly coupled to the pressure-differential sensor and the conduit fittings of the first and second sensor probes, respectively.

In some embodiments, the second passageway includes an outlet formed in the base.

In some embodiments, the elongated body is defined by first and second shell portions attached to each other by a snap fit.

In some embodiments, the base is defined by first and second base portions of the first and second shell portions.

In some embodiments, the fitting is defined by first and second fitting portions of the first and second shell portions.

In some embodiments, the temperature sensor includes a thermistor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a perspective view of the first shell portion with a thermistor and wire received therein.

Corresponding reference numerals indicate corresponding parts throughout the several views of the drawings.

DETAILED DESCRIPTION

Figure 1:
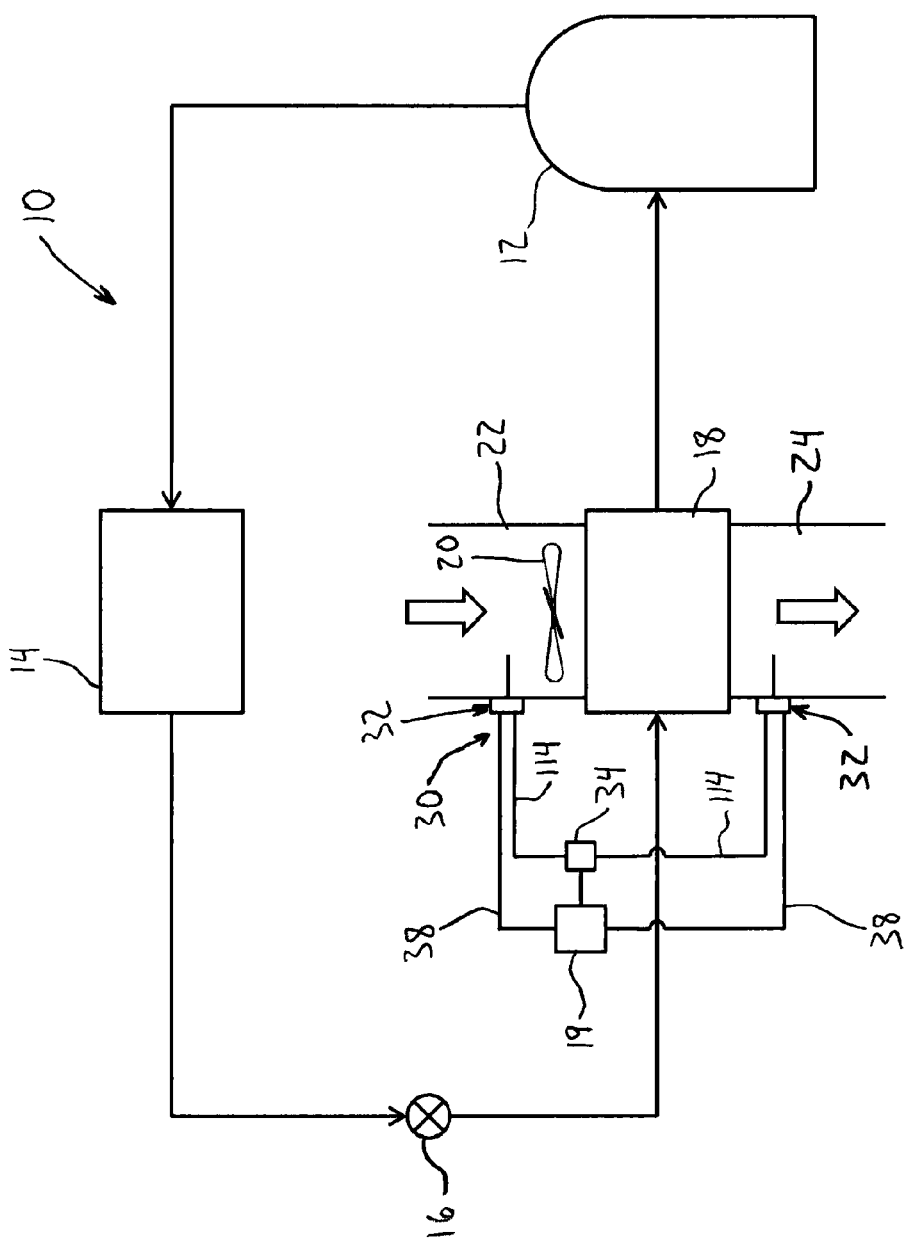
FIG. 1 is a schematic representation of a climate control system including sensor probes according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a system 10 is provided that may include a compressor 12, an outdoor heat exchanger 14, an expansion device 16, and an indoor heat exchanger 18. The compressor 12 can be a scroll compressor, for example, or any other type of compressor, and may circulate a working fluid (e.g., a refrigerant) between the outdoor and indoor heat exchangers 14, 18. In some embodiments, the system 10 may include a reversing valve (not shown) that may be operable to control a direction of working fluid flow through the system 10. A control module 19 may switch the reversing valve between a first position corresponding to a cooling mode and a second position corresponding to a heating mode. In some embodiments, the system 10 may be an air-conditioning system or a refrigeration system operable only in a cooling mode.

In the cooling mode, (shown in FIG. 1) the outdoor heat exchanger 14 may operate as a condenser or as a gas cooler and may cool discharge-pressure working fluid received from the compressor 12 by transferring heat from the working fluid to ambient air, for example. In the heating mode, the outdoor heat exchanger 14 may operate as an evaporator.

In the cooling mode, the indoor heat exchanger 18 may operate as an evaporator and may transfer heat from a space to be cooled (e.g., a room within a house or building) to the working fluid in the indoor heat exchanger 18. In the heating mode, the indoor heat exchanger 18 may operate as a condenser or as a gas cooler and may transfer heat from working fluid discharged from the compressor 12 to a space to be heated.

During operation of the system 10, a fan 20 may draw air from the space to be heated or cooled through a return-air duct 22 and force the air across the indoor heat exchanger 18 to transfer heat between the working fluid in the indoor heat exchanger 18 and the air. From the indoor heat exchanger 18, the heated or cooled air may be forced through a supply-air duct 24 to the space to be heated or cooled.

As shown in FIG. 1, the system 10 may also include a sensor assembly 30 that measures temperatures of air flowing through the return-air duct 22 and air flowing through the supply-air duct 24 as well as an air pressure differential between the return-air duct 22 and the supply-air duct 24. The sensor assembly 30 may communicate these values to the control module 19. Additionally or alternatively, the system 10 may include a sensor assembly 30 that measures temperatures and pressure differentials of refrigerant flowing through refrigerant lines of the system 10 (e.g., temperatures and pressure differential of refrigerant upstream and downstream of one of the heat exchangers 14, 18 or the expansion device 16). The control module 19 may control and/or monitor operation of the system 10 based on data received from the sensor assembly 30. Additionally or alternatively, control module 19 may diagnose faults of the system 10 based on data received from the sensor assembly 30.

Each sensor assembly 30 may include a pair of sensor probes 32 and a pressure-differential sensor 34. The sensor probes 32 may be mounted to the return-air duct 22 and the supply-air duct 24 (via fastener, adhesive, and/or magnet, for example). As will be subsequently described, the sensor probes 32 may provide fluid communication between the pressure-differential sensor 34 and the return-air duct 22 and between the pressure-differential sensor 34 and the supply-air duct 24. The pressure-differential sensor 34 may measure a pressure differential between air in the return-air duct 22 and air in the supply-air duct 24 and may communicate the pressure differential to the control module 19. In some embodiments, the sensor assembly 30 may include a single sensor probe 32 connected to a pressure sensor (not shown) that measures a pressure of a given fluid rather than two sensor probes 32 connected to a pressure-differential sensor 34, as described above.

Each sensor probe 32 may include a thermistor 36 (FIGS. 6 and 7) or any other suitable temperature sensor to measure a temperature of the air in a corresponding air duct 22, 24. The thermistor 36 may communicate measured temperature values to the control module 19 through a wire 38 and/or through a wireless transmitter (not shown), for example.

Referring now to FIGS. 2-7, the sensor probes 32 may include a probe housing 40 that contains the thermistor 36 and a portion of the wire 38. The probe housing 40 may include first and second shell portions 42, 44 that engage each other via a snap fit, for example, or any other suitable fastening method. While the probe housing 40 is described herein as being formed by attaching individually molded first and second shell portions 42, 44 to each other, it will be appreciated that the probe housing 40 could be formed in as a single monolithic body, for example, or in any other suitable manner.

The first shell portion 42 may include a first elongated body 46, a first fitting portion 47, and a first base portion 48 that are integrally formed with each other. The first elongated body 46 may extend from the first base portion 48 in a first direction and may include a pointed tip 49 and a plurality of barbed protuberances 51. The first fitting portion 47 may extend from the first base portion 48 in a second direction opposite the first direction.

Figure 4:
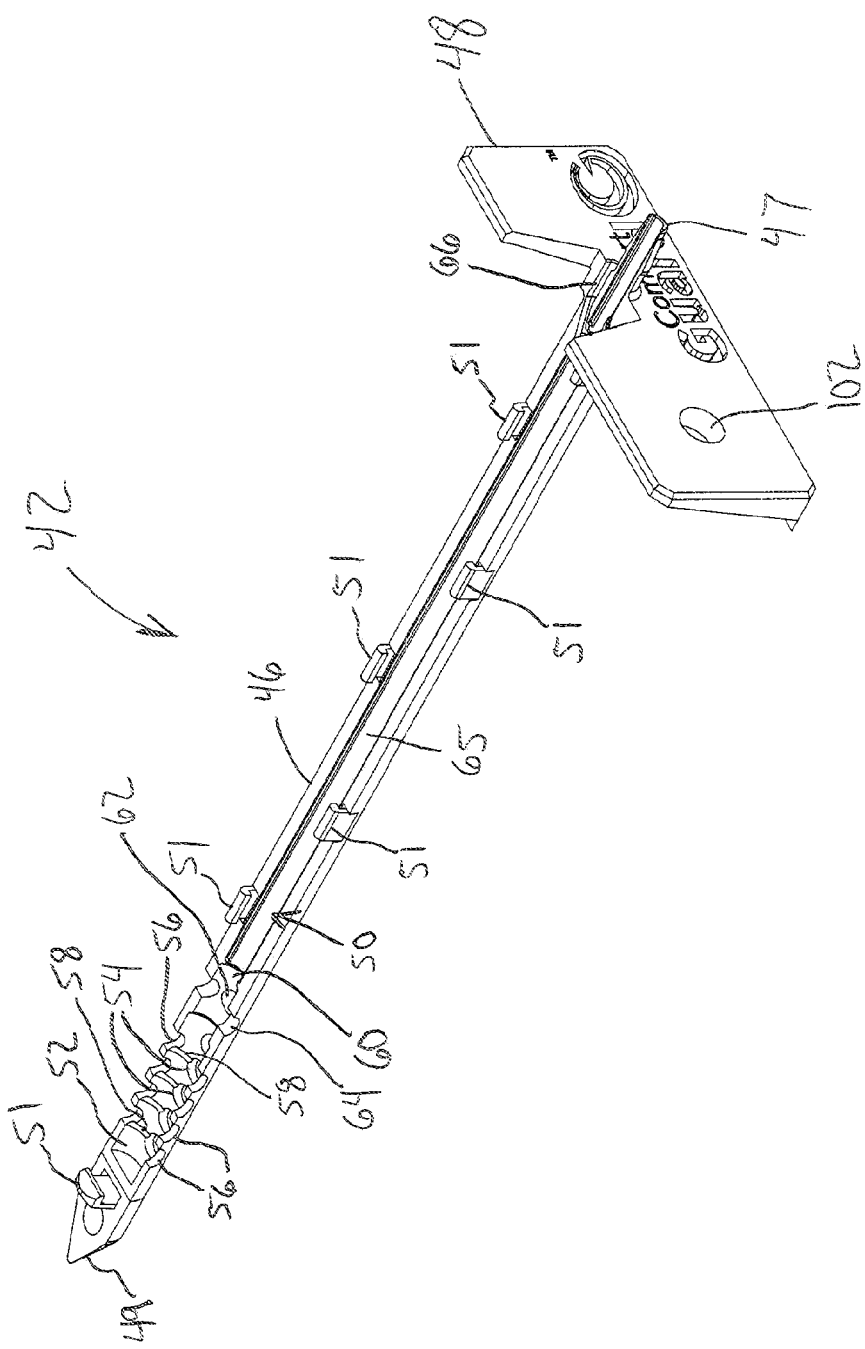
FIG. 4 is a perspective view of a first shell portion of the sensor probe.
Figure 7:
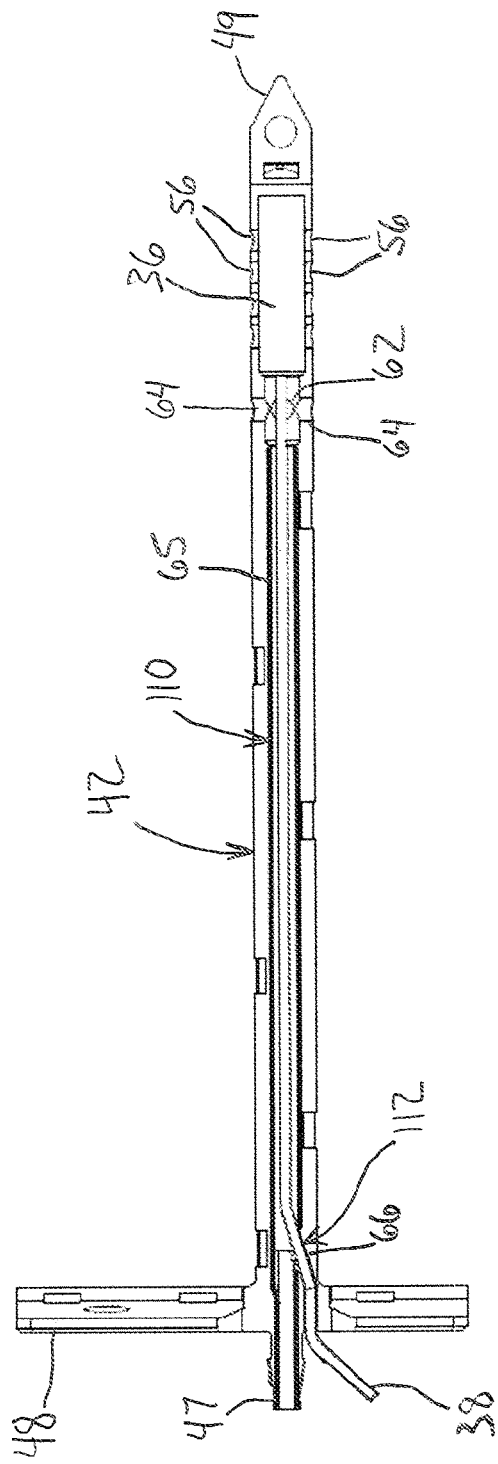
FIG. 7 is a plan view of the first shell portion, thermistor and wire.

As shown in FIGS. 4, 6 and 7, a first elongated channel 50 may be formed in the first elongated body 46 and fitting portion 47 that extends along a longitudinal axis of the first elongated body 46 and extend through at least a portion of the first elongated body 46, the fitting portion 47 and the first base portion 48. A first portion 52 of the first elongated channel 50 may include a plurality of apertures 54 and a plurality of partial apertures 56 extending through the first elongated body 46. Grooves 58 may be formed in the first portion 52 to provide communication between adjacent apertures 54 and partial apertures 56. The first portion 52 may be sized to partially receive the thermistor 36, as shown in FIGS. 6 and 7.

A second portion 60 of the elongated channel 50 may have a smaller diameter than the first portion 52, thereby forming a step between the first and second portions 52, 60. The second portion 60 may include one or more apertures 62 and one or more partial apertures 64. A third portion 65 of the elongated channel 50 may extend between the second portion 60 and a distal end of the fitting portion 47. In some embodiments, the third portion 65 may include a diameter that is smaller than the diameter of the second portion 60.

The diameters of the second and third portions 60, 65 may be sized so to be larger than a diameter of the wire 38. As shown in FIGS. 6 and 7, the wire 38 extends from the thermistor 36 through the second portion 60 and through a portion of the third portion 65. The wire 38 may also extend through a first wire channel 66 formed in the first elongated body 46 and the first base portion 48. The first wire channel 66 may have a diameter that is substantially equal to the diameter of the wire 38.

The second shell portion 44 may include a second elongated body 70, a second fitting portion 72 and a second base portion 74 that are integrally formed with each other and configured to matingly engage the first elongated body 46, the first fitting portion 47 and the first base portion 48, respectively. The second shell portion 44 may include a second elongated channel 76 and a second wire channel 78 that are substantially similar to the first elongated channel 50 and the first wire channel 66.

Figure 2:
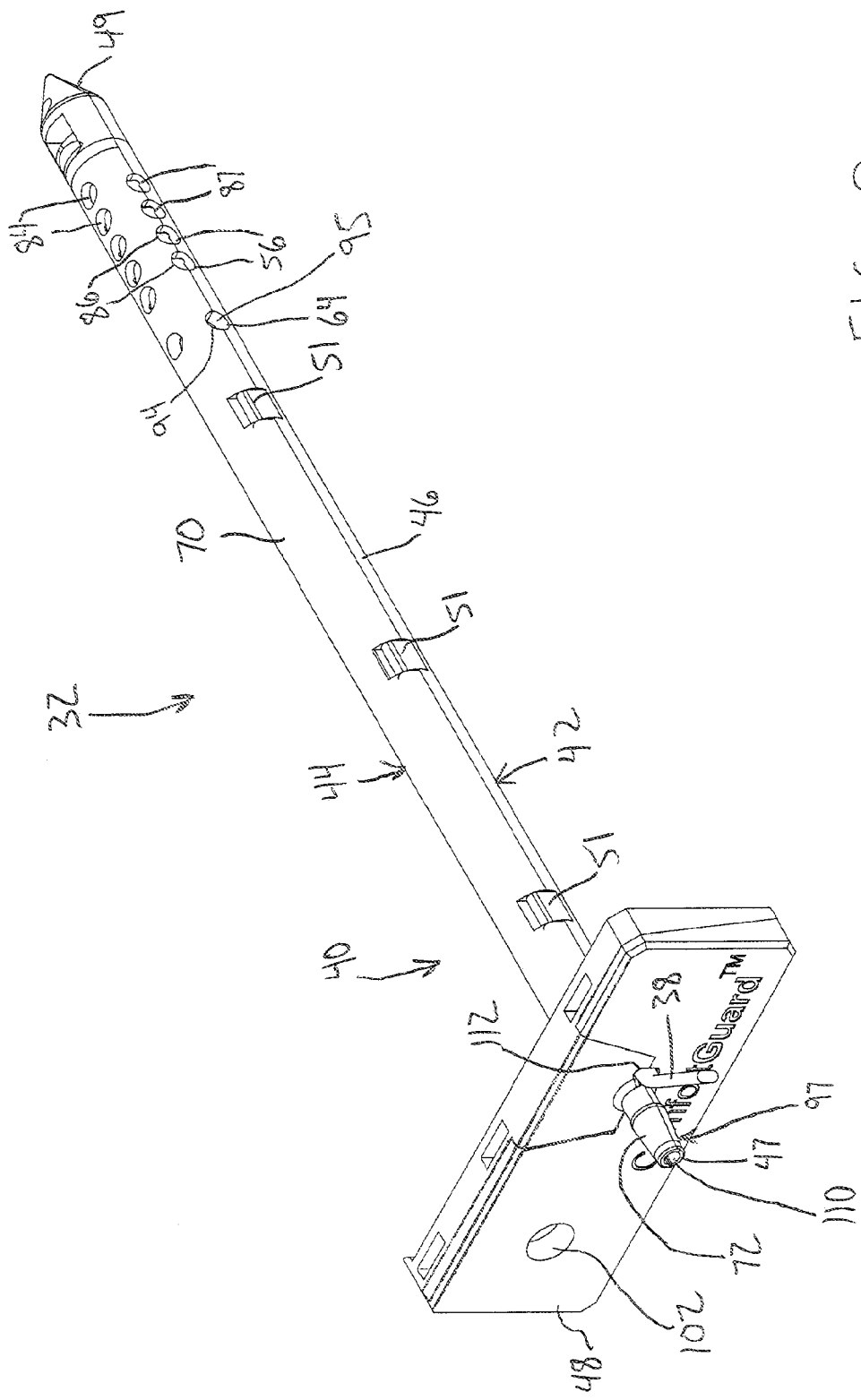
FIG. 2 is a perspective view of one of the sensor probes of FIG. 1.
Figure 3:
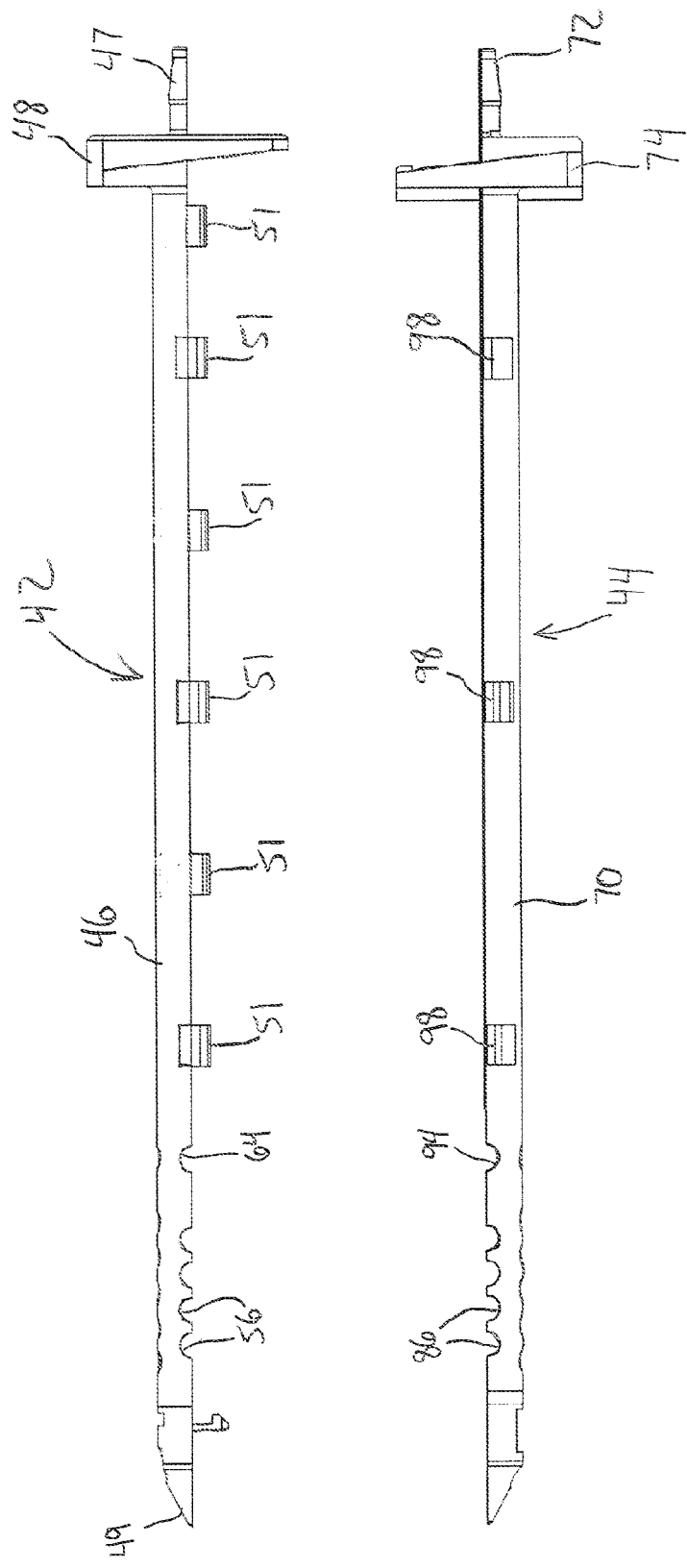
FIG. 3 is an exploded view of the sensor probe.

As described above, the second elongated channel 76 may include a first portion 80 having a plurality of apertures 84 and a plurality of partial apertures 86. Grooves 88 may be formed in the first portion 80 to provide communication between adjacent apertures 84 and partial apertures 86. The partial apertures 86 are aligned with the partial apertures 56 of the first shell portion 42 when the first and second shell portions 42, 44 are secured together, as shown in FIG. 2, thereby forming apertures 87.

A second portion 90 of the second elongated channel 76 may have a smaller diameter than the first portion 80 and may include one or more apertures 92 and one or more partial apertures 94. The partial apertures 94 are aligned with the partial apertures 64 of the first shell portion 42 when the first and second shell portions 42, 44 are secured together, as shown in FIG. 2, thereby forming apertures 95.

A third portion 96 of the second elongated channel 76 may extend between the second portion 90 and a distal end of the second fitting portion 72. In some embodiments, the third portion 96 may include a diameter that is smaller than the diameter of the second portion 90.

The diameters of the second and third portions 90, 96 may be sized so to be larger than a diameter of the wire 38. The wire 38 extends from the thermistor 36 through the second portion 90 and through a portion of the third portion 96. The wire 38 may also extend through the second wire channel 78, which may have a diameter that is substantially equal to the diameter of the wire 38.

As described above, the first and second shell portions 42, 44 may matingly engage each other by a snap fit. That is, the barbed protuberances 51 of the first shell portion 42 may snap into engagement with corresponding recesses 98 formed in the second shell portion 44. Similarly, the first and second base portions 48, 74 may snap into engagement with each other. In this manner, the first and second elongated channels 50, 76 cooperate to form a first enclosed passageway 110, and the first and second wire channels 66, 78 cooperate to form a second enclosed passageway 112 that extends from the first enclosed passageway 110. The first enclosed passageway 110 provides a fluid-pressure pathway between the apertures 95 and the distal end of the fitting 97 formed by the fitting portions 47, 72. The wire 38 extends through the first enclosed passageway 110 and out of the sensor probe 32 through the second enclosed passageway 112. The wire 38 seals the second passageway 112 to restrict or prevent air from leaking around the wire in the second passageway 112.

When the first and second shell portions 42, 44 are secured together (as shown in FIG. 2), the sensor probe 32 can be installed into a corresponding one of the air ducts 22, 24 (as shown in FIG. 1). Installation of the sensor probe 32 into the corresponding air duct 22, 24 can include forming a hole in the air duct 22, 24 and passing the elongated bodies 46, 70 therethrough such that the distal end of the elongated bodies 46, 70 is disposed in the stream of air flowing through the air duct 22, 24. In some embodiments, the air ducts 22, 24 may be formed from a relatively soft polymeric material or a fibrous material. In such embodiments, the pointed tip 49 of the sensor probe 32 may allow the sensor probe 32 to be inserted through the wall of the duct 22, 24 without pre-drilling a hole.

Figure 5:
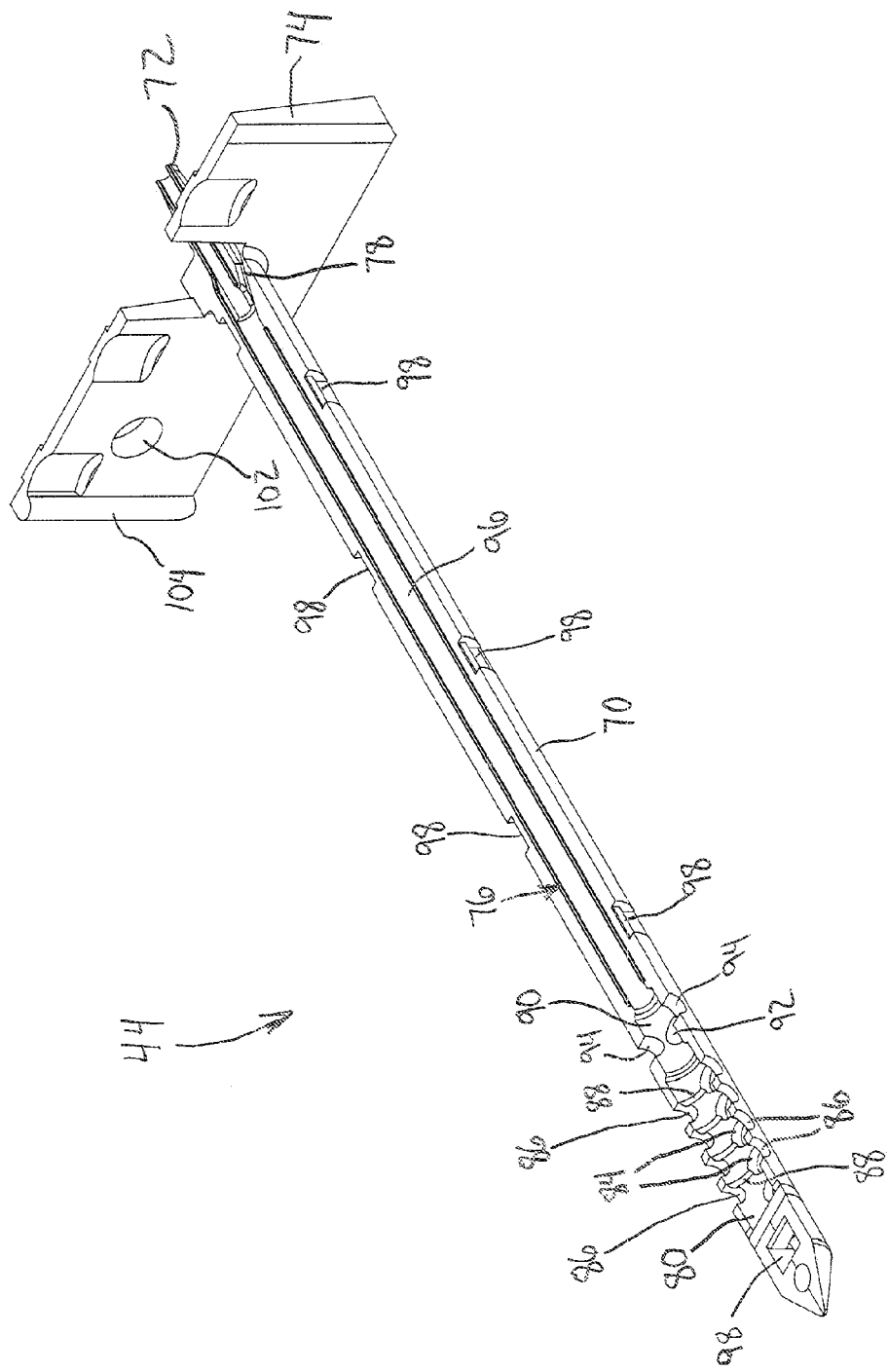
FIG. 5 is a perspective view of a second shell portion of the sensor probe.
Figure 9:
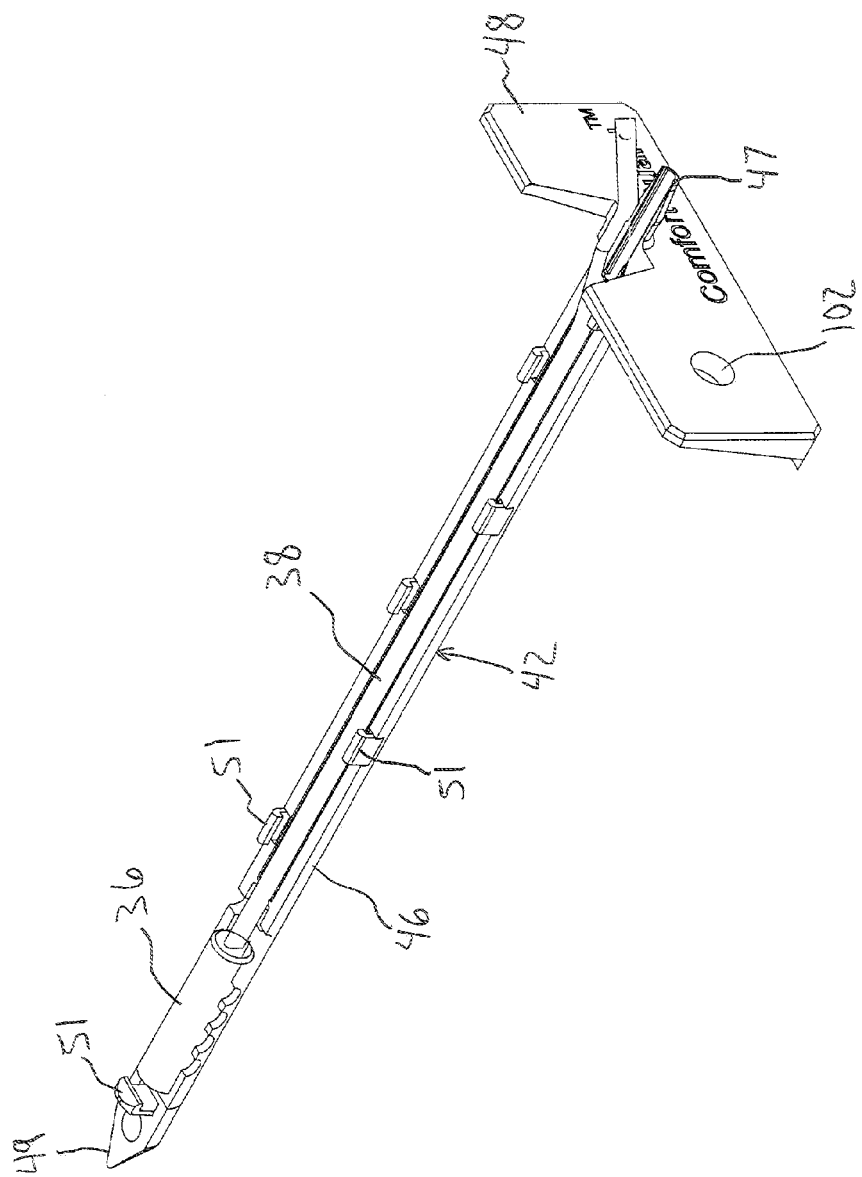

The first and second base portions 48, 74 may be held against an outer wall of the duct 22, 24 and a screw or other fastener may be driven through an aperture 102 in the base portions 48, 74 and into the outer wall of the duct 22, 24. As shown in FIG. 5, the base portion 74 of the second shell portion 44 may include a cam ridge 104 that acts as a fulcrum to urge the elongated bodies 46, 70 into the air duct 22, 24 as the screw is driven through the aperture 102 and into the wall of the air duct 22, 24. This allows the sensor probe 32 to be securely fixed to the air duct 22, 24 using a single screw. In some embodiments, the sensor probes 32 may be secured to the wall of the air ducts 22, 24 by any additional or alternative means, such as adhesive bonding and/or magnetic attraction, for example. In some embodiments, a gasket may be employed to provide a seal between the sensor probe 32 and a hole in the wall of the duct 22, 24 through which the sensor probe 32 extends.

After securing a sensor probe 32 to each of the air ducts 22, 24, a hose 114 (FIG. 1) may be connected to the fittings 97 of both sensor probes 32. The hose 114 may be fluidly coupled to the pressure-differential sensor 34. Apertures 62, 92, 95 expose the first enclosed passageway 110 of each sensor probe 32 to the fluid pressure within the corresponding duct 22, 24, thereby forming a pressure path that extends through the first enclosed passageway 110 and through the hose 114 to the pressure-differential sensor 34. At the same time, apertures 54, 84, 87 expose the thermistor 36 to the temperature of the air flowing through the corresponding ducts 22, 24. Electrical current indicative of the temperature of the air is transmitted from the thermistor 36 to the control module 19 through the wire 38 that extends through a portion of the first enclosed passageway 110 (such that the pressure path is coaxial with the wire 38) and through the second enclosed passageway 112.

In some embodiments, the sensor assembly 30 could be a portable tool that could be carried by a service technician or system installer, for example. In such embodiments, the pressure-differential sensor 34 can be temporarily connected to the control module 19 for signal communication therebetween (e.g., through a wired or wireless connection), and the sensor probes 32 can be temporarily installed into the corresponding air ducts 22, 24. In this manner, the sensor assembly 30 can acquire the appropriate measurement data and communicate the data to the control module 19, as described above. While acquiring the measurements, the service technician or installer may hold the sensor probes 32 in place relative to the air ducts 22, 24 by hand or by removable clips or magnets, for example. After communicating the data to the control module 19, the service technician or installer can disconnect the pressure-differential sensor 34 from the control module 19 and remove the sensor probes 32 from the air ducts 22, 24 so that the sensor assembly 30 can be reused to facilitate installation and/or diagnostics of a different system.

While the sensor assembly 30 is described above as being capable of acquiring temperature and pressure data, it will be appreciated that the sensor assembly 30 could be used to acquire only temperature data or only pressure data.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sensor probe comprising:
   an elongated body including at least one first aperture, at least one second aperture, a first passageway and a second passageway, said first passageway in communication with said first aperture and extending along a longitudinal axis of said elongated body, said second passageway in communication with and extending from said first passageway;
   a temperature sensor disposed within said first passageway and including a wire extending through a portion of said first passageway and said second passageway, said wire having a diameter that is less than a diameter of said first passageway such that said first passageway defines a pressure path around said wire, said at least one second aperture in communication with said first passageway and disposed between said temperature sensor and said second passageway.

2. The sensor probe of claim 1, wherein said wire sealingly engages said second passageway.

3. The sensor probe of claim 1, wherein said at least one first aperture provides communication between an ambient environment and said temperature sensor.

4. The sensor probe of claim 3, wherein said elongated body includes a plurality of first apertures providing communication between the ambient environment and said temperature sensor.

5. The sensor probe of claim 4, wherein said elongated body includes grooves providing communication between said first apertures.

6. The sensor probe of claim 1, further comprising a base from which said elongated body extends, said first and second passageways extending through said base.

7. The sensor probe of claim 6, further comprising a conduit fitting extending from said base in a direction opposite said elongated body, wherein said first passageway extends through said conduit fitting.

8. The sensor probe of claim 7, wherein said second passageway includes an outlet formed in said base.

9. The sensor probe of claim 8, wherein said elongated body is defined by first and second shell portions attached to each other by a snap fit.

10. The sensor probe of claim 9, wherein said base is defined by first and second base portions of said first and second shell portions.

11. The sensor probe of claim 10, wherein said fitting is defined by first and second fitting portions of said first and second shell portions.

12. The sensor probe of claim 1, wherein said temperature sensor includes a thermistor.

13. A sensor assembly for a climate control system comprising:
   a pressure-differential sensor; and
   first and second sensor probes in communication with said pressure-differential sensor, each of the first and second sensor probes including:
   an elongated body including at least one first aperture, at least one second aperture, a first passageway and a second passageway, said first passageway in communication with said first aperture and extending along a longitudinal axis of said elongated body, said second passageway in communication with and extending from said first passageway; and
   a temperature sensor disposed within said first passageway and including a wire extending through a portion of said first passageway and said second passageway, said wire having a diameter that is less than a diameter of said first passageway such that said first passageway defines a pressure path around said wire, said at least one second aperture in communication with said first passageway and disposed between said temperature sensor and said second passageway.

14. The sensor assembly of claim 13, wherein said at least one first aperture provides communication between an ambient environment and said temperature sensor.

15. The sensor assembly of claim 13, wherein each of said first and second sensor probes includes a base from which said elongated body extends, said first and second passageways extending through said base.

16. The sensor assembly of claim 15, wherein each of said first and second sensor probes includes a conduit fitting extending from said base in a direction opposite said elongated body.

17. The sensor assembly of claim 16, wherein said first passageway extends through said conduit fitting.

18. The sensor assembly of claim 17, further comprising first and second conduits fluidly coupled to said pressure-differential sensor and said conduit fittings of said first and second sensor probes, respectively.

19. A sensor probe comprising:
an elongated body including at least one first aperture, a first passageway and a second passageway, said first passageway in communication with said first aperture and extending along a longitudinal axis of said elongated body, said second passageway in communication with and extending from said first passageway, said elongated body defined by first and second shell portions attached to each other by a snap fit;
a temperature sensor disposed within said first passageway and including a wire extending through a portion of said first passageway and said second passageway, said wire having a diameter that is less than a diameter of said first passageway such that said first passageway defines a pressure path around said wire; and
a base from which said elongated body extends, said first and second passageways extending through said base, said second passageway including an outlet formed in said base.

20. The sensor probe of claim 19, wherein said elongated body includes at least one second aperture in communication with said first passageway and disposed between said temperature sensor and said second passageway.

* * * * *